US005423040A

United States Patent [19]
Epstein et al.

[11] Patent Number: 5,423,040
[45] Date of Patent: Jun. 6, 1995

[54] SYSTEM AND METHOD FOR EFFICIENTLY EXECUTING DIRECTED ACYCLIC GRAPHS

[75] Inventors: David A. Epstein, Ossining, N.Y.; Glenn G. Gilley, Chapel Hill, N.C.; Kevin P. McAuliff, Peekskill, N.Y.

[73] Assignee: International Business Machines Corporation, Armonk, N.Y.

[21] Appl. No.: 181,457

[22] Filed: Jan. 14, 1994

Related U.S. Application Data

[63] Continuation of Ser. No. 733,745, Jul. 24, 1991, abandoned.

[51] Int. Cl.6 .......................... C06F 9/00; C06F 12/00
[52] U.S. Cl. ..................... 395/650; 395/400; 364/DIG. 1; 364/232.22; 364/81.4; 364/281.8; 364/243.3; 364/243.4
[58] Field of Search ............... 364/DIG. 1, DIG. 2

[56] References Cited

U.S. PATENT DOCUMENTS

| | | | |
|---|---|---|---|
| 4,333,144 | 6/1982 | Waiteside et al. | 364/200 |
| 4,441,165 | 4/1984 | Coleman et al. | |
| 4,599,693 | 7/1986 | Denenberg . | |
| 4,670,848 | 6/1987 | Schramm . | |
| 4,675,806 | 6/1987 | Uchida | 395/375 |
| 4,682,365 | 7/1987 | Orita et al. | |
| 4,698,752 | 10/1987 | Goldstein et al. | |
| 4,748,674 | 5/1988 | Freeman et al. | |
| 4,814,978 | 3/1989 | Dennis | 364/200 |
| 4,825,360 | 4/1989 | Knight, Jr. | 364/200 |
| 4,849,905 | 7/1989 | Loeb et al. | |
| 4,866,605 | 9/1989 | Nakano et al. | 364/200 |
| 4,922,413 | 5/1990 | Stoughton et al. | 364/200 |
| 4,980,824 | 12/1990 | Tulpule et al. | 395/650 |
| 4,991,087 | 2/1991 | Burkowski et al. | 364/200 |

OTHER PUBLICATIONS

Rutledge, "Efficient Data Flow Analysis Package," *IBM Technical Disclosure Bulletin*, vol. 24, No. 2, pp. 1139–1143 (Jul., 1981).

Rhyne, "Method for Automated Assembly of Software Versions," *IBM Technical Disclosure Bulletin*, vol. 30, No. 5, pp. 353–359 (Oct., 1987).

*Primary Examiner*—Kevin A. Kriess
*Assistant Examiner*—Lucien Toplu
*Attorney, Agent, or Firm*—Sterne, Kessler, Goldstein & Fox; Louis J. Percello

[57] ABSTRACT

A system and method for efficiently evaluating and executing unresolved data variables used as input for functional processes in a previously defined acyclic dataflow graph (or sequence of instructions which may be so represented). Embodiments of the present invention also contemplate maintaining previously computed values of data elements so that re-evaluation of the entire data flow graph or portions thereof may not be necessary.

12 Claims, 8 Drawing Sheets

SYSTEM AND METHOD FOR EFFICIENTLY EXECUTING DIRECTED ACYCLIC GRAPHS

This application is a continuation of U.S. application Ser. No. 07/733,745, filed Jul. 24, 1991, now abandoned.

DESCRIPTION

1. Technical Field

The present invention is a system and method for efficiently evaluating unresolved data variables used as input for functional processes. More specifically, the present invention relates to a system and method for efficiently evaluating data elements to be used as input for functional processes within a previously defined directed acyclic dataflow graph (or sequence of instructions which may be so represented), and for executing those functional processes. In addition, embodiments of the present invention contemplate maintaining previously computed values of data elements so that re-evaluation of the entire dataflow graph or portions thereof may not be necessary.

2. Background Art

Dataflow computing schemes (as represented by dataflow graphs) have generally been motivated by the need to get away from an underlying machine model which is inherently sequential, to one which naturally supports parallelism. The dataflow scheme is an alternative to the conventional control-oriented Von Neumann architecture (that is, the sequential paradigm) and is capable of efficiently exploiting the parallelism that is inherent in many types of computations.

In dataflow schemes, computer programs or functional processes of some type (hereafter collectively referred to as "functional processes") are represented as nodes linked together in a graphical form. Data elements (representative of the data input and output of the various functional processes) are also shown in the dataflow graph. In a dataflow graph, lines drawn between functional processes (that is, a data path) directly reflect the partial ordering imposed by their data dependencies. On the other hand, functional processes between which there is no data path can be safely executed concurrently.

In dataflow schemes, the execution of functional processes is driven by events rather than requiring that the functional processes execute sequentially. In particular, a functional process will execute only when all of its input operands (that is, the data elements which it requires as input) are available. It is this activation of functional process execution, determined by the availability of data, that allows for the efficient extraction, exploitation, and self-scheduling of the parallel operations inherent in dataflow schemes.

The execution of functions in implementations of dataflow schemes are typically initiated by the arrival of new constant input values. This allows the functional processes dependent upon this value to begin executing. The execution of these functional processes generates new, intermediate values for other data elements which serve as the inputs to other functional processes. These computed values propagate through the operations dependent upon them until the output data are finally produced. When a new value arrives, the process begins again.

In conventional dataflow models, the intermediate values determined for the data elements are transient. That is, once the data in a data element has been utilized by a functional process dependent upon that data, the space used for storing the data is reclaimed. In addition, conventional dataflow models replicate the data used as inputs by multiple functional processes rather than just using a single data element. Also, by design, a functional process executes only when all of its operands become available. Because data elements are discarded once they are used, this requires that all intermediate values be regenerated in order to re-compute an output value.

Both hardware and software implementations of schemes to evaluate and execute the various functional processes within a scheme represented by a dataflow graph presently exist. However, the emphasis has been on relatively expensive and inflexible hardware systems. In addition, conventional dataflow models also suffer from deficiencies including limits on the number of data elements that a functional process can be dependent upon, limits on the number of data elements that a functional process can generate output data for and limits on the number of concurrently executing invocations of a functional process. Examples of conventional dataflow evaluation and execution schemes can be found in the article "Dataflow Machine Architectures" by Veen, A. H., published in *ACM Computing Surveys*, Volume 18, No. 4, December 1986.

Thus, what is needed is a system and/or method for overcoming the deficiencies of the conventional technology as discussed above.

DISCLOSURE OF INVENTION

The present invention overcomes the deficiencies of the previous devices by providing a system and method (embodiments of which advantageously contemplate utilizing software where hardware was conventionally used) to efficiently evaluate a conglomeration of functional processes as represented by a dataflow graph. It is contemplated that this conglomeration is executed (using a representative dataflow graph) by a function evaluator and a function executor (which in some embodiments consist of the same entity). The purpose of the function evaluator is to determine the status of the input data for each of the functional processes, and using that data to determine whether those functional processes may be executed. Thus, it scans the dataflow graph in some fashion in order to make this determination. Once this is done, the function executor causes the particular functional process to execute.

Embodiments of the present invention contemplate that the evaluation process begins at the "bottom" of the dataflow graph by analyzing the bottom-most functional process and determining whether all of its inputs (that is, all of its data elements) have been computed. If not, then it is contemplated by various embodiments that the present invention proceeds up the dataflow graph using a depth-first search in an attempt to find inputs (that is, data elements) which have been computed. Once this is found, then the function evaluator will indicate to the function executor (either directly by using an execution list or indirectly by marking the appropriate functional process) that the functional process having all of its input data elements computed is ready to be executed.

Some embodiments of the present invention contemplate that a functional cache and signature generator are used to maintain the values of data elements from past computations. In other words, when the values of data elements are computed, they are stored in the functional cache. That way, if the values of data elements which are constants are changed and cause the values of other data elements to be recomputed, the original values are still maintained. That way, if the constant data element values are later switched back to their original (or otherwise former) values, then the stored values will become "active," and the data elements will not have to be re-computed. The present invention accomplishes this by using the signature generator to generate a unique signature for each of the data elements based upon the function used to generate that data element and the signature of all of its inputs. Using this scheme also has the effect of "short-circuiting" the dataflow graph, which means that only those portions of the graph whose data elements need to be re-computed are re-computed.

The foregoing and other objects, features and advantages of the present invention will be apparent from the following more particular description of preferred embodiments of the invention, as illustrated in the accompanying drawings.

BRIEF DESCRIPTION OF DRAWINGS

Various objects, features, and attendant advantages of the present invention can be more fully appreciated as the same become better understood with reference to the following detailed description of the present invention when considered in connection with the accompanying drawings, in which.

BEST MODE FOR CARRYING OUT THE INVENTION

I. Overview

The present invention is a system and method for efficiently evaluating unresolved data variables used as input for functional processes. More specifically, the present invention relates to a system and method for efficiently evaluating data elements to be used as input for functional processes within a previously defined directed acyclic dataflow graph (or sequence of instructions which may be so represented), and for executing those functional processes. In addition, embodiments of the present invention contemplate maintaining previously computed values of data elements so that re-evaluation of the entire dataflow graph or portions thereof may not be necessary.

Figure 1:
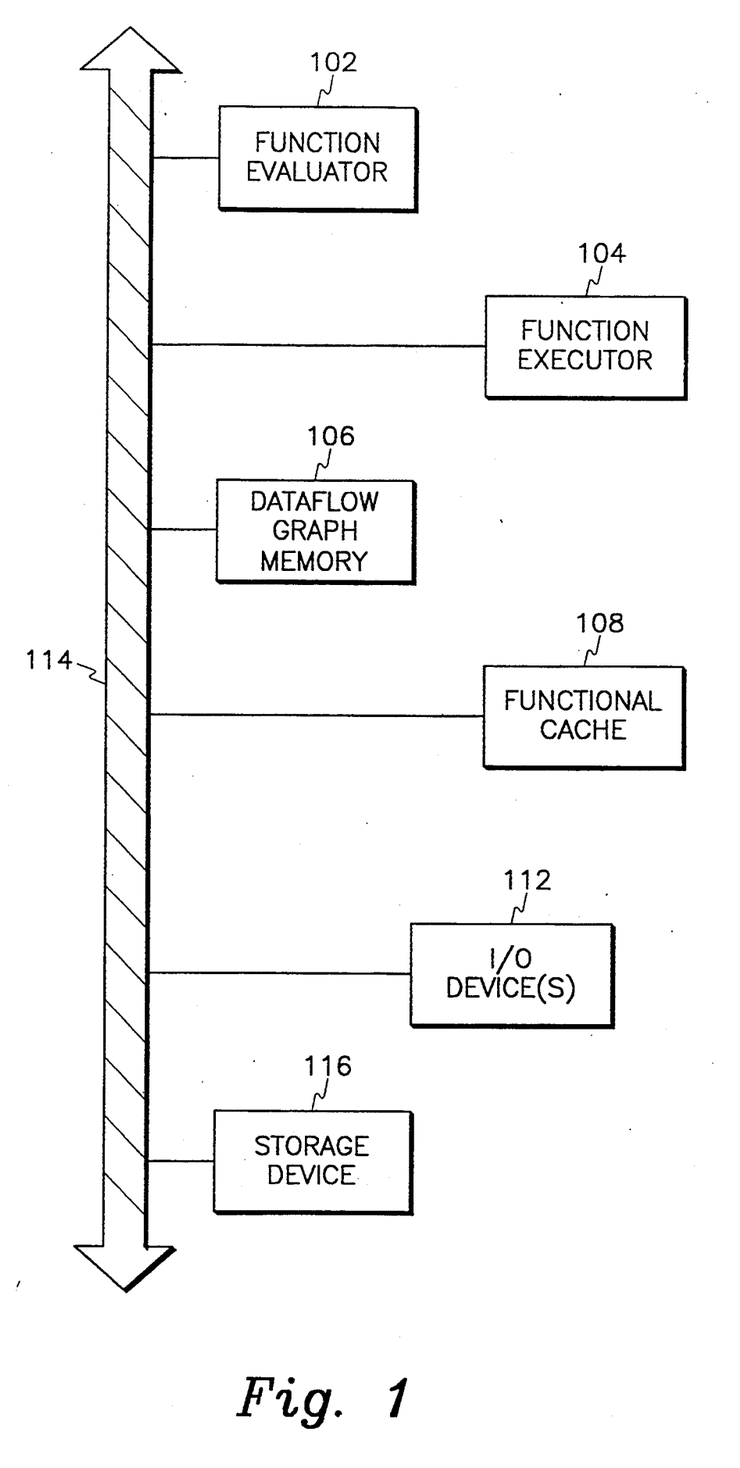
FIG. 1 is a diagram of the environment and components as contemplated by embodiments of the present invention.

Embodiments of the present invention contemplate utilizing an environment such as that shown by FIG. 1. Referring now to FIG. 1, a communications channel 114 (which could be a bus or a network) connects various portions of the environment for utilization with the present invention. The purpose of a function evaluator 102 is to determine the status of the input data for each of the functional processes, and using that data to determine whether those functional processes may be executed. Embodiments of the present invention contemplate that the function evaluator 102 comprises one or more central processing units (CPU(s)) for driving the function evaluator 102 and a memory device (such as Random Access Memory) to store computer programs which perform the function evaluations. Details of the function evaluator 102 as contemplated by various embodiments of the present invention will be discussed further below.

A function executor 104 is envisioned by various embodiments of the present invention to also comprise one or more CPUs for driving the function executor 104, as well as some memory device to store computer programs which perform the function executions. The function executor 104 actually executes the various functional processes once the functional evaluator 102 has indicated that a particular functional process is ready for execution. Further details of the function executor 104 will be discussed below.

A dataflow graph memory 106 is contemplated as memory containing the dataflow graph representative of the functional processes being operated on and their relationships to one another.

A functional cache 108 is contemplated to contain pointers to data elements whose values have been previously (or will be) computed. Details regarding the function cache 108 will be discussed further below.

It should be understood that the memory devices discussed above can be separate entities, or they can all be part of a large, single memory device. In addition, it should be understood that additional memory devices to perform various computations are also contemplated for use by the present invention.

The I/O device(s) 112 can be a display device, printer, or any other I/O device which might be appropriate for the particular application of the dataflow graph at issue (that is, the one or ones stored in the dataflow graph memory 106). A storage device 116 is contemplated for use as a mass-storage device, which can be used for such functions as overflow where the other memory devices run out of room.

An example of a hardware environment for use with embodiments of the present invention is an IBM Power Graphics Visualization 7245 Server from IBM Corporation of Armonk, N.Y. Of course, it should be understood that any number of hardware environments could also be used.

In particular, the present invention computes the data elements required for the execution of functional processes. These functional processes and data elements are "linked" together in a way that can be represented by a directed acyclic graph. This "graphical form" is merely a way to show how various data elements and functional processes are linked together. Such a graphical representation shows the dependencies between various data elements and functional processes. The fact that the graph is directed means that the flow of data "moves" only in one direction (that is, dependencies are top-down), and the fact that the graph is acyclic means that no data dependency "loops" may be formed (which would otherwise result in an infinite loop).

Figure 2:
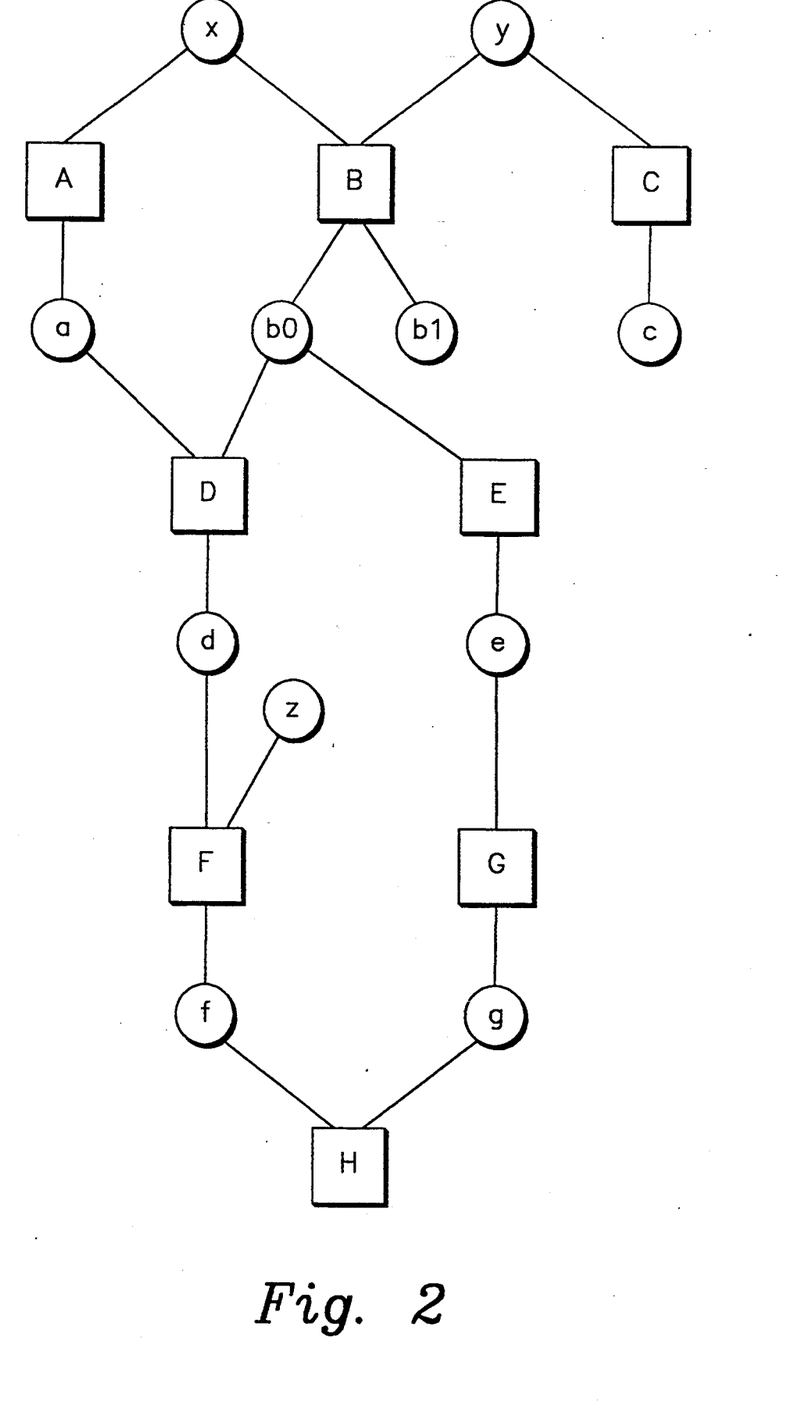
FIG. 2 is an example of a dataflow graph which can be operated on by the present invention.

An example of a dataflow graph as contemplated for use by the present invention is shown in FIG. 2. Referring now to FIG. 2, the circles represent data elements (that is, constants or data variables) and the squares represent functional processes. A dataflow graph such as that of FIG. 2 could actually represent any number of schemes. One example could be the generation of a picture from raw data. In such a scheme, the functional process "H" might represent a functional process for sending data representative of a two-dimensional image to a display device, while the functional process "F" could be a functional process which places the data in its two-dimensional form (and thus, the two dimensional data itself would reside in data element "f"). In additional, functional process "G" might be a functional process which determines which of several display devices to send the two-dimensional picture to.

In the example of FIG. 2, it should be evident that in order for functional process "H" to execute, it requires that both data elements "f" and "g" be resolved (that is, that they contain actual data and are not unresolved variables). When "H" is first evaluated, data elements "f" and "g" will be unresolved. In order to resolve them, functional processes "F" and "G" need to be executed. For this to occur, it can be seen that "F" requires the resolution of data elements "d" and "z" while functional process "G" requires the resolution of data element "e."

The attempt to execute and resolve the various functional processes and data elements occurs all the way up the dataflow graph until data elements "x" and "y" are reached.

These data elements are constants (and thus are "resolved"), which allows the functional processes "A", "B" and "C" to execute (since all inputs of these functional processes are considered "resolved." When this occurs, those data elements below these functional processes (that is, "a", "b0", "b1" and "c") will then become resolved, so that the functional processes below them (that is, "D" and "E") can execute, since now all of their inputs have been resolved. This effect trickles down the dataflow graph until functional process "H" finally is executed.

Again, it should be understood that FIG. 2 merely diagrammatically shows an example of how various functional processes and data elements are dependent upon each other in a scheme to generate and send two-dimensional data on a visual display device. Of course, the present invention contemplates use with virtually any type of dataflow diagram (and the actual schemes they represent) from executing a spell check on a word processing program to launching a rocket ship.

Figure 3:
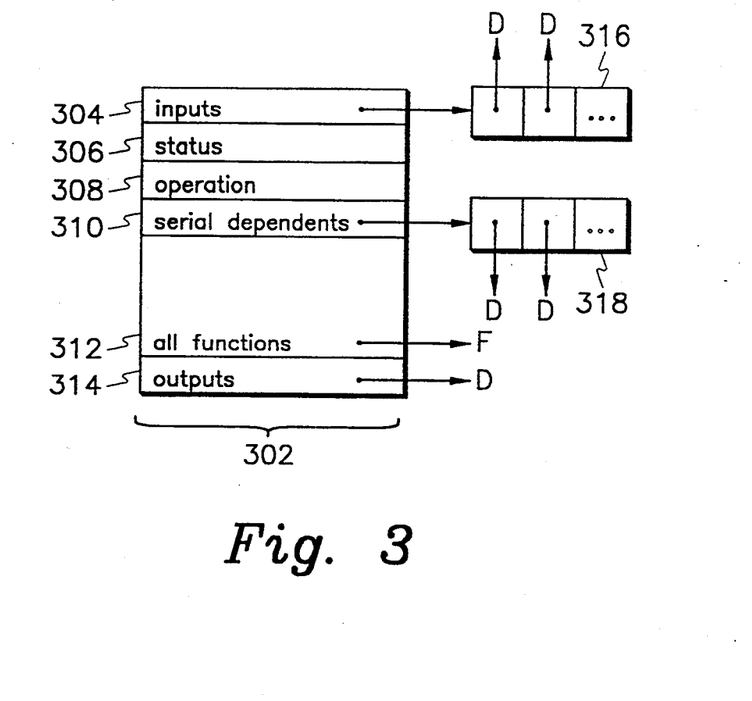
FIG. 3 is an example of the structure of a functional process as contemplated for use with embodiments of the present invention.

Embodiments of the present invention contemplate that the data elements and the functional processes are organized in a fashion which allows the present invention to most efficiently operate. An example of the structure of a functional process as contemplated by embodiments of the present invention can be seen from FIG. 3. Referring now to FIG. 3, a functional process 302 is divided into various sections. The inputs section 304 contains pointers to the data elements which are required for the functional process to perform its function. Thus, in FIG. 2, the inputs section 304 for functional process "D" would contain pointers to "a" and "b0." Block 316 represents the fact that multiple pointers can be stored within the input section 304, and thus multiple data elements can be utilized by the functional process 302. Note that the arrows in block 316 indicate that the pointers point to the data elements.

The status section 306 indicates the status of the functional process as to whether the functional process has executed. That is, an indication is given as to whether the functional process has executed, is executing or has not yet executed. In some embodiments contemplated by the present invention, a functional process can be "marked" for execution. Such a mark would be placed in the status section 306.

The operation section 308 contains the actual computer program (or the address of a hardware functional unit) which is to perform the transformation on the data elements which are pointed to by the input section 304.

The serial dependent section 310 allows the present invention to impose an additional sequencing of computation of data elements not inherent in the dataflow graph itself. Embodiments of the present invention contemplate that this would be used in situations when functional processes which cause side effects (for example, I/O events) must be executed in a specific order.

Embodiments of the present invention also contemplate the use of a serial dependence section 310 for debugging purposes. The block 318 indicates that more than one pointer can be stored which points to the data element to be resolved (and thus which would cause a functional process to execute where all of its input data elements are resolved).

The all-functions section 312 is used to store pointers to functional processes which allow the evaluators and executors to conveniently access all functional processes. Thus, referring back to FIG. 2, functional process "A" would point to functional process "B" which in turn points to functional process "C" etc.

The outputs section 314 contains a pointer to the data element that the functional process 302 resolves. Embodiments of the present invention contemplate that this can be more than one output. For example, referring to functional process "B" it can be seen that it contains two outputs "b0" and "b1." While only two are shown in this example, it should be emphasized that the present invention can accommodate functional processes having any number of outputs.

Figure 4:
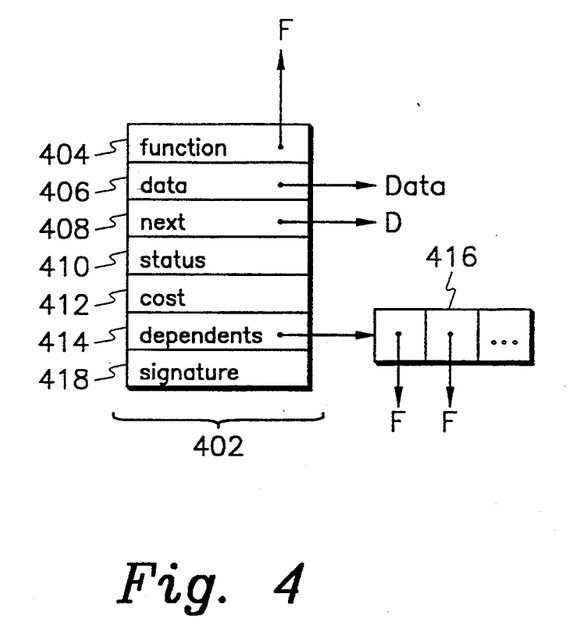
FIG. 4 is an example of the structure of a data element as contemplated by use with embodiments of the present invention.

As indicated above, embodiments of the present invention contemplate that the data elements are also organized in a fashion which allows the present invention to most efficiently operate. An example of this organization is shown in FIG. 4. Referring now to FIG. 4, a data element 402 is shown comprising several sections. The first is a function section 404 which is a pointer to the functional process which created (or will create) the data for this data element 402. It should be noted, however, that the function section 404 would be null if the data element were at the top of the dataflow graph. Thus, referring to the example of FIG. 2, the data elements "x" and "y" are constants which have been set by the user, and thus are not generated by any other functional process.

The data section 406 contains a pointer to a storage location in a memory device (as discussed with regard to FIG. 1 above) which contains the data which was generated by the parent functional process (or user if the data element is a constant). Of course, if the data element has not yet been computed, the data section 406 would be null.

The "next" section 408 contains a pointer to a data element that has been created by the same functional process as the present data element 402. Thus, for example, referring back to FIG. 2, the "next" section 408 in data element b0 would contain a pointer to data element "b1," since the data generated by these data elements was generated by the same functional process "B". Further, if functional process "B" also generated data for an additional data element "b2" then the "next" section 408 in data element "b1" would point to "b2."

A status section performs a similar function to the status section 306 in the functional process 302 shown in FIG. 3. Thus, status section 410 of data element 402 indicates whether the functional process 402 has been evaluated (which indicates that the data section 406 now points to an address containing a data value) or whether the data element is uncomputed.

A cost section 412 is contemplated to be a value which can be set by a user to take into account various factors relating to the computational "cost" of the data element. The purpose of this section is that while the present invention attempts to maintain all previously computed data values in a memory device, there may be situations where the amount of memory in the memory device becomes insufficient. In those situations, the present invention will release the data pointed to by the data section 406 in those data elements having the lowest value in the cost section 412.

The dependent section 414 contains all the functional processes which use the data element 402 as an input. As can be seen from block 416, the present invention contemplates that a single data element can be used by multiple functional processes. An example of this, referring to FIG. 2, is that data element "b0" is used as input by functional processes "D" and "E."

The signature section 418 contains a signature value that will be associated with the data element 402.

Figure 5:
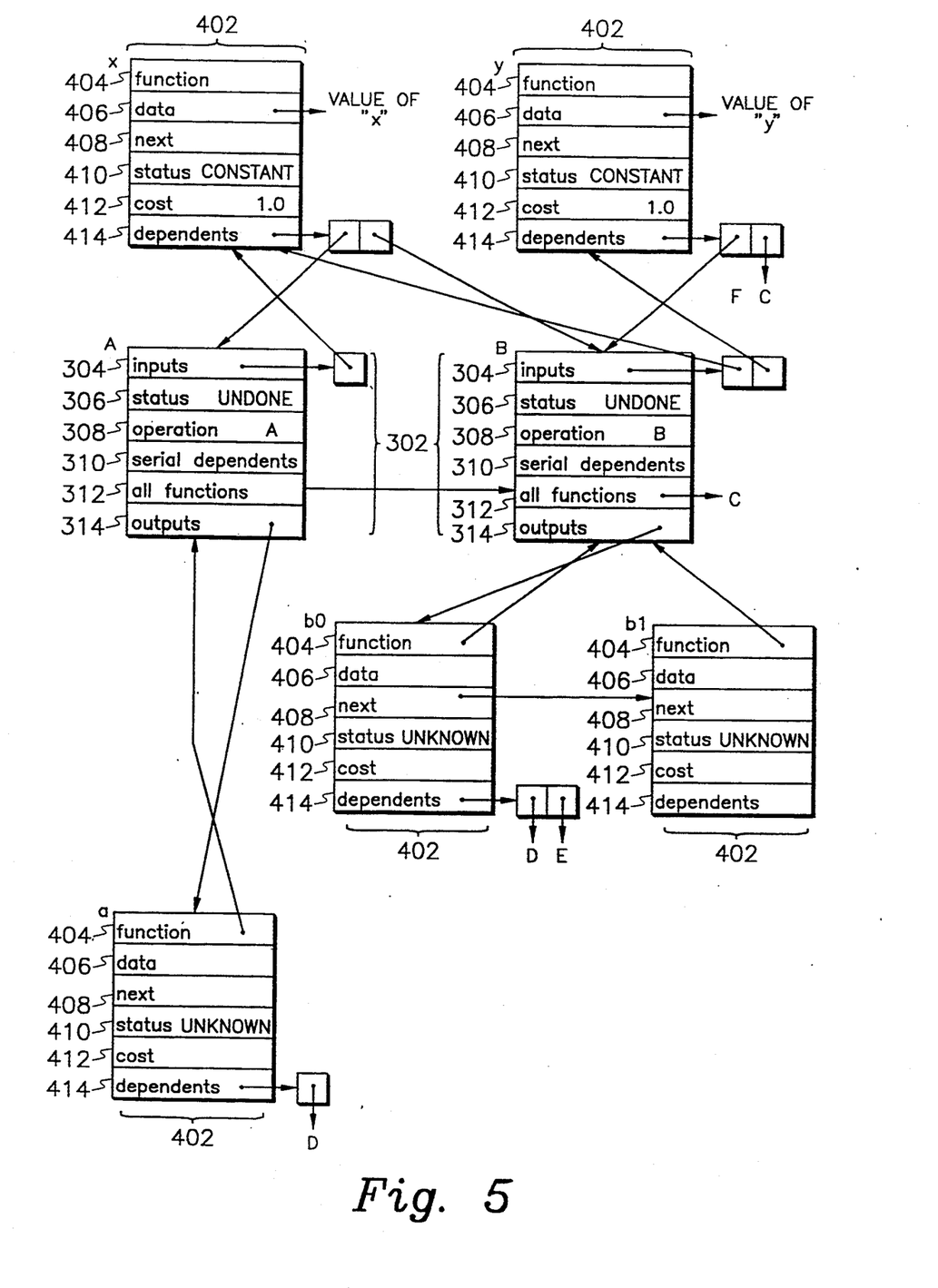
FIG. 5 is an example of the relationships between functional processes and data elements as contemplated for use by embodiments of the present invention.

An example of the structures described above in conjunction with FIGS. 3 and 4 are now described within a dataflow graph setting as discussed with regard to FIG. 2. More specifically, the top portion of FIG. 2 is now described in the context of the above-discussed structure, in FIG. 5. Referring now to FIG. 5, this example shows the contents of various data element and functional processes prior to evaluation. For example, the status of data elements "a" and "b0", and "b1" are all uncomputed (that is, "unknown"). Similarly, the status of functional processes "A", and "B" are "undone." Data elements "x" and "y" are constants, and are thus never computed. In general, one need only compare FIG. 5 to FIG. 2 in light of the description of the structures of the data elements and functional processes above to comprehend the meaning of the values within the various sections of the data elements 402 and functional processes 302, and the meanings of the various pointers as designated by the connecting arrows. While the structure for the data elements 402 and the functional processes 302 described above are constructed as contemplated by the present invention, it should be understood that the present invention also contemplates other similar types of structures which can be used in describing data elements and functional processes generally.

II. Evaluation and Execution of Functional Processes

Figure 6:
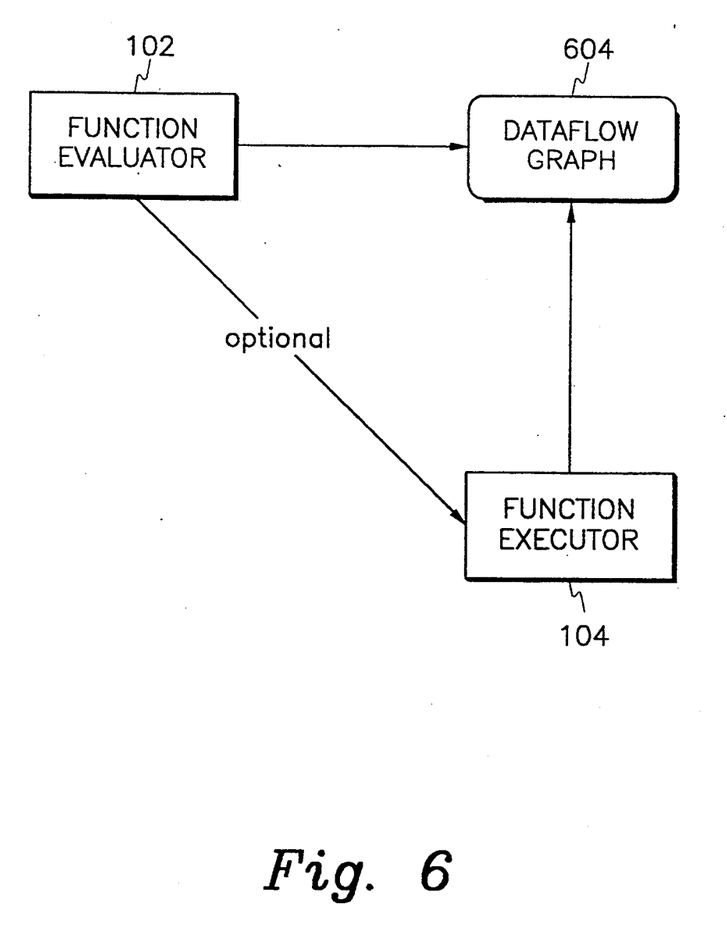
FIG. 6 is a diagram showing the interaction of the function evaluator and function executor with a dataflow graph as contemplated by embodiments of the present invention.

Embodiments of the present invention for evaluating and executing the functional processes represented by one or more dataflow graphs are discussed below. Some embodiments of the present invention contemplate that dataflow graphs as described in the examples above can be evaluated and executed separately. This is indicated by FIG. 6. Specifically, FIG. 6 shows that function evaluator 102 and function executor 104 can operate on the dataflow graph 604 separately. The purpose of the function evaluator 102 is to determine the status of the input data for each of the functional processes, and using that data to determine whether those functional processes may be executed. Thus, it scans the dataflow graph in some fashion in order to make this determination. Once this is done, the function executor 104 causes the particular functional process to execute.

In some embodiments of the present invention, the function evaluator 102 can activate the function executor 104 when it is determined that all required data elements for the input of a particular functional process have been computed. Alternatively, other embodiments contemplate that the function executor 104 runs independently of the function evaluator 102, wherein the function evaluator 102 merely marks the functional processes when they are ready for execution, and the function executor 104 continually checks the status section 310 (or its equivalent) of the functional processes 302 for such markings. Thus, because in some (but not all) embodiments of the present invention the function evaluator 102 can activate the function executor 104, the connection between function evaluator 102 and function executor 104 in FIG. 6 is labeled as "optional."

It should be understood that the function evaluator 102 and function executor 104 can also function as a single entity, and/or be generated as multiple instances to work on various portions of the dataflow graph simultaneously. In addition, where the environment in which the present invention operates comprises multiple processors, the present invention also advantageously takes advantage of these as well. In this way, the present invention allows for parallel evaluation and execution of various portions of the dataflow graph which are not dependent upon one another.

Embodiments of the present invention contemplate that the function evaluator 102 begin the overall evaluation of the data elements comprising the dataflow graph by checking the status section 306 of the functional process at the end or "bottom" of the dataflow graph. If a functional process has already been evaluated, then the evaluation scheme will abort. If the functional process has not been evaluated, then each of the data elements which are inputs for the functional process are computed. In order to do this, though, all the data elements in the entire dataflow graph upon which this functional process depends need to be computed.

Some embodiments of the present invention contemplate that the evaluation scheme discussed above utilizes a recursive scheme where the dataflow graph is traversed depth first until data elements which are constants (or otherwise have computed values) are found. (Searches other than depth-first are also contemplated by other embodiments.) When the constants or computed values are reached, then at that time the functional processes which depend upon those data elements are scheduled for execution. In this scheme, embodiments of the present invention contemplate that each functional process has a prerequisite counter which is incremented by the function evaluator 102 for each data element that the functional process is dependent on.

The scheme discussed above is shown below by the following pseudo-code. It is envisioned that this pseudo-code can be used to generate source code for the present invention in a suitable language, such as C or PASCAL:

```
1.  Evaluate (n)
2.    Check status of node n and abort if already
      evaluated
3.    For each of n's inputs i
4.      If it is not a constant or already computed
        value
5.        Evaluate (function generating input i)
6.        Increment function node prerequisite
          count
7.    If all inputs were constants or already computed
      values
8.      Schedule n for execution
```

Once a functional process at the "top" of the dataflow graph (or any other functional process for that matter) has been marked for execution, the function is then executed using the function executor 104. As indicated above, this can be done either because of an some activating event from the function evaluator 102, or because the function evaluator 104 has (independently of the function evaluator 102) detected an appropriate mark in the status section 306 of the functional process.

Once executed, embodiments of the present invention contemplate that for each of the data elements which are an output of the executed functional process, the function evaluator 102 will decrement the prerequisite counter for each of the functional processes which have as an input those data elements which were the output of the executed functional process. If the prerequisite counter for any of those functional processes reach zero, that means that the functional process is ready for execution, and is scheduled for such. In this way, all functional processes in the dataflow graph are executed.

```
1.  Execute (n)
2.    Execute function associated with node n
3.    For each of n's outputs o
4.      For each of o's dependent functions
5.        Decrement its prerequisite count
6.        If the count reaches 0
7.          Schedule the dependent function
            for execution
```

It should be noted that in order to most effectively allow the function evaluator 102 and the function executor 104 to traverse the dataflow graph, the present invention utilizes various sections of functional processes 302 and data elements 402 as discussed with regard to FIG. 3 and FIG. 4 above. For example, in order to determine which functional process generates the data for data element "a", function section 404 in data element "a" contains a pointer to functional process "A."

III. Optimization Using a Functional Cache and Signature Generator

Figure 7:
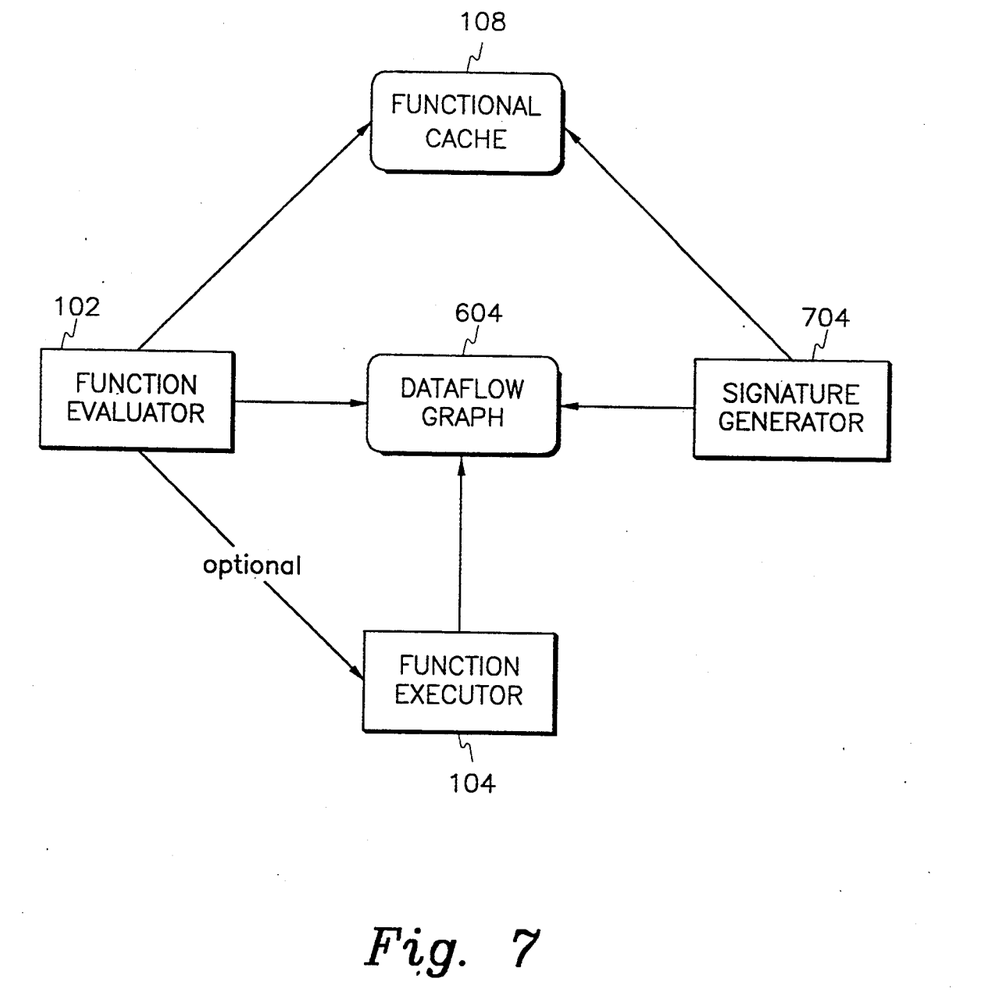
FIG. 7 is a diagram of an embodiment of the present invention utilizing a functional cache and signature generator.

Various embodiments of the present invention contemplate that the function evaluator 102 and function executor 104 operate in conjunction with a signature generator 704 and functional cache 108. In essence, the signature generator 704 generates a unique signature for each data element. The signature acts as a key to data which has been previously been computed for the data element. (If no data has yet been computed for a data element, then its signature references a null). In this way, the signature scheme prevents previously computed data from being needlessly re-computed.

Embodiments of the present invention contemplate that each signature of a specific data element is a combination of some aspect of the function used to generate that data element (for example, the function's name or address) and the signature of all of its inputs. For example, referring to FIG. 8, data element "e" would have a signature of "E, (B, signature (x), signature(y))." Since "B, signature (x), signature (y)" is the signature of data element "b0" the signature of "e" can also be written as "E, signature(b0)". In any event, if a user were to change the value of the data element "x" (which in this example is a constant), the signature for "e" would also change.

Embodiments of the present invention contemplate that the signatures, once generated, are used as keys to store data in the functional cache 108. In addition, it is envisioned that the signature generator 704 automatically changes the signature of a data element as soon as a data element upon which it depends is changed. It does this by analyzing each data element which is an input for a given functional process, and determining whether it is a constant or a value to be computed. If it is a value to be computed, then the signature generator 704 will continue to traverse up the dataflow graph and continue to perform the above-mentioned analysis until a constant is found. At that point, it will then utilize that constant in forming new signatures for the data elements which are dependent from the constant and store them in functional cache 108. Some embodiments of the present invention contemplate that the signatures themselves are stored in the functional cache 108. Others contemplate that the signatures are merely used as keys to locate values in the cache, and are thus stored in the signature section 418.

Some embodiments of the present invention contemplate that a recursive scheme be used by the signature generator 704 in generating the signatures. An example of such a scheme is set forth in the pseudo-code below:

```
1.  For each output function node n
2.    Signature (n)
3.
4.  Signature (n)
5.    For each of n's inputs i
6.      If i is a constant
7.        Apply the constant signature function
          to i
8.      If i is a value to be computed
9.        Signature (function generating input i)
10.     Apply the functional signature function to n's
11.     function and inputs' signatures
```

Figure 8:
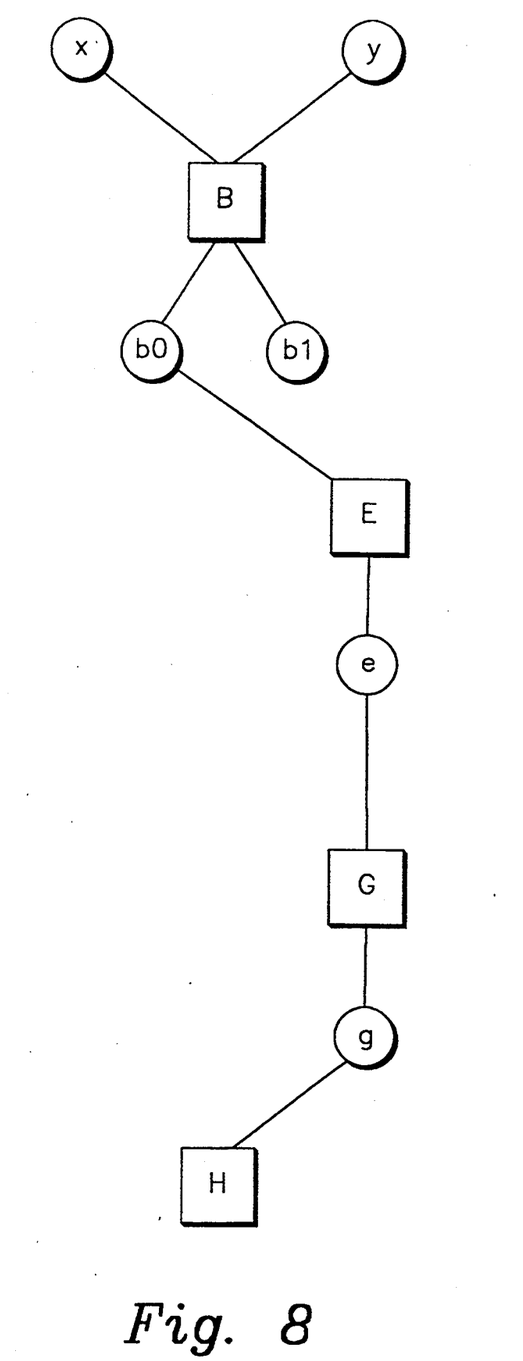
FIG. 8 is another example of a data flow graph which can be operated on by the present invention.

Embodiments of the present invention contemplate that the generated signatures are utilized in a way which can best be explained with reference to the example of the dataflow graph shown in FIG. 8. Referring now to FIG. 8, the present invention first analyzes functional process "H" and determines if it has been evaluated. If not, it attempts to evaluate it by first checking if data element "g" is a constant. If it is not a constant, the present invention then searches the functional cache 108 to see if there is any data value associated with the signature.

The first time the present invention operates on the dataflow graph of FIG. 8, the signature of "g" (which would be stored in the functional cache 108 as G,(E,B, signature(x),signature(y))) would not point to any data value, since it would be uncomputed. When the dataflow graph is traversed upward (to ultimately evaluate functional process "H"), however, "g" is eventually resolved, and a data value is associated with the signature. Embodiments of the present invention contemplate that efforts are made to constantly store this signature and its data value, regardless of subsequent occurrences.

An advantage of maintaining a functional cache 108 as described above is that if a request to evaluate functional process "H" subsequently occurs (and no constants in the dataflow graph have been changed), then the functional cache 108 can be utilized to quickly access the data already computed. Thus, embodiments of the present invention contemplate that the functional cache 108 is some type of a fast memory device, such as SRAM.

It should be noted, that after the evaluation of the dataflow graph and the storage of the computed data elements in the functional cache 108, if a user subsequently changes a value of a constant, such as "x", then the signatures for the data elements will also change, since they are a function of the values of the data elements upon which they depend. Thus, if "x" is changed and a request is sent for functional process "H" to be evaluated, then, again, "g" is analyzed to see if it is a constant, or if a value associated with its signature exists in the functional cache 108. Since the constant "x" has been changed, the signature has been changed and is shown to be uncomputed. Consequently, the present invention must again traverse the graph to recompute "g".

To continue the example, as indicated above, the present invention saves previous signatures and their data values which were computed prior to the above-noted change of the constant "x." Thus, if the constant "x" is changed back to its original value, that means that all of the data elements will then have the signature that they did prior to the first change in the constant "x." Thus, re-evaluation of the dataflow graph would not be necessary, since a query of the signature for "g" will now render a pointer to an already computed data value.

In addition, the embodiment described above also allows the present invention only to evaluate those portions of the dataflow graph which are necessary. For example, referring back to FIG. 2, if constant "z" is changed, then the present invention would only have to re-compute data element "f", but can use the signatures of the other data elements to obtain the values of the data elements in those portions of the dataflow graph which are not affected by data element "z" from the functional cache 108.

One example of an embodiment contemplated by the present invention to perform the dataflow graph evaluation using signatures is set forth below by the following pseudo-code:

```
1.  Evaluate (n)
2.  Check status of node n and abort if already
    evaluated
3.  For each of n's inputs i
4.      If it is not a constant or already computed
        value
5.          Search the functional cache using i's
            signature as the key
6.          If not found
7.              Insert a placeholder into the
                cache
8.              Increment n's prerequisite
                count
9.              Evaluate (function generating
                input i)
10.         If found
11.             If not yet computed
12.                 Increment n's
                    prerequisite count
13.                 Add a dependency from
                    found variable to n
14. If all inputs were constants or already computed
    values
15.     Schedule n for execution
```

More details on the way in which the functional cache 108 and signature generator 704 operate as contemplated by embodiments of the present invention can further be seen from pending U.S. patent application No. 07/721,807, entitled "Method and Apparatus for Saving and Retrieving Functional Results," which is incorporated by reference herein.

It should be understood that the dataflow graphs discussed above are by way of example, and that the present invention contemplates operation with any number of different configurations.

It should also be understood that embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention. In particular, the pseudo-code discussed above can be especially useful for creating the software embodiments.

While the invention has been particularly shown and described with reference to preferred embodiments thereof, it will be understood by those skilled in the art that various changes in form and details may be made therein without departing from the spirit and scope of the invention.

What is claimed is:

1. A computer-implemented system for evaluating and executing a plurality of functional processes operating in a directed and acyclical manner, each of the plurality of functional processes receiving one or more data element inputs, the one or more data element inputs including a computed data element having a computed data element value generated by a generating functional process and a constant data element having a constant data element value, the system comprising:

a function cache for storing data element values of the one or more data element inputs;

signature generator means, coupled to said function cache, for generating a signature for each of the data element values, wherein said signature is a function of a selected aspect of the generating functional process and signatures of the data element inputs received by the generating functional process, said signature indicating a location of the data element value in said function cache;

function evaluator means, coupled to said signature generator means and said function cache, for recursively evaluating uncomputed dam elements in a depth-first manner, and for retrieving a previously computed dam element value associated with said uncomputed data element from said function cache when a signature of said previously computed data element value is identical to a signature of said uncomputed data element value; and functional executor means, coupled to said function evaluator means, for executing the generating functional process when said previously computed data element value associated with said data element does not exist in said function cache.

2. The system of claim 1, wherein said function evaluator means and said function executor means operate in parallel with each other, and wherein said function evaluator means further comprises means for activating said function executor means.

3. The system of claim 1, further comprising:
sequencing means coupled to said signature generator means and said function evaluator means, for imposing an additional sequencing of the one or more functional processes, said additional sequencing indicating which of the one or more data element inputs upon which said one or functional processes do not depend upon.

4. The system of claim 3, wherein said signatures are utilized as keys to locate said data element in said function cache.

5. The system of claim 4, wherein said function evaluator means further comprises means for activating said function executor means.

6. The system of claim 5, further comprising:
a descriptor block associated with each of the data elements, said descriptor block including:
   a computational status indicator indicating whether said associated data element is resolved, wherein said function evaluator means scans said associated descriptor block to determine the computational status of said associated data element.

7. The system of claim 6, wherein said signatures are stored in said descriptor block of the plurality of data elements.

8. A computer-implemented method for evaluating and executing a plurality of functional processes, each of the plurality of functional processes utilizing one or more of a plurality of data elements as inputs, the plurality of functional processes including one or more generating functional processes configured to generate data elements, the generating functional processes having one or more data element inputs, the plurality of functional processes operating in a directed and acyclical manner wherein each of the plurality of data elements inputs utilized by a utilizing functional process is resolved by the one or more generating functional processer which determines an associated value of the data element before the utilizing functional process is processed, the method comprising the steps of:

(a) storing values of each of the plurality of data elements in a functional cache;
(b) generating, by a signal generator coupled to said functional cache, a signature associated with each of the values of the plurality of each data elements, each said signature being a function of a selected aspect of the generating functional process and signatures of all data element inputs to the generating functional process, each said signature identifying a location in said a functional cache of the associated value of the data element;
(c) determining, by a function evaluator coupled to said signal generator, whether data element inputs to a selected generating functional process have constant or computed data element values;
(d) if the data element value is computed, searching said functional cache for a previously computed dam element value associated with said signature, thereby preventing recomputation of previously computed data element values; and
(e) if said previously computed data element value is not located in said functional cache, executing the generating functional process to generate said computed data element value.

9. The method of step 8, wherein said step (c) comprising the steps of:
(1) determining whether said evaluated functional processes are executable, said functional processes being executable when all of the data elements utilized by said particular functional process are resolved;
(2) determining whether each of said executable functional processes is required to be recomputed, wherein a particular functional process is required to be recomputed when said data element inputs are resolved; and
(3) scanning said functional cache and determining if said data element inputs has a previously generated value.

10. The method of step 9, further comprising the step of:
(4) performing said steps (1)–(3) on the plurality of functional processes which generate data elements having values which have changed and which are not available in said function cache.

11. The method of step 10, further comprising the steps of:
(5) automatically updating said signature associated with the one or more data elements by said signature generator means when any relied-upon data elements has changed.

12. The method of step 11, further comprising the steps of:
(6) generating an available status indication associated with said each of the plurality of functional processes, said available status indication indicating whether said each of the plurality of functional processes is executable.

* * * * *